Patented Nov. 4, 1941

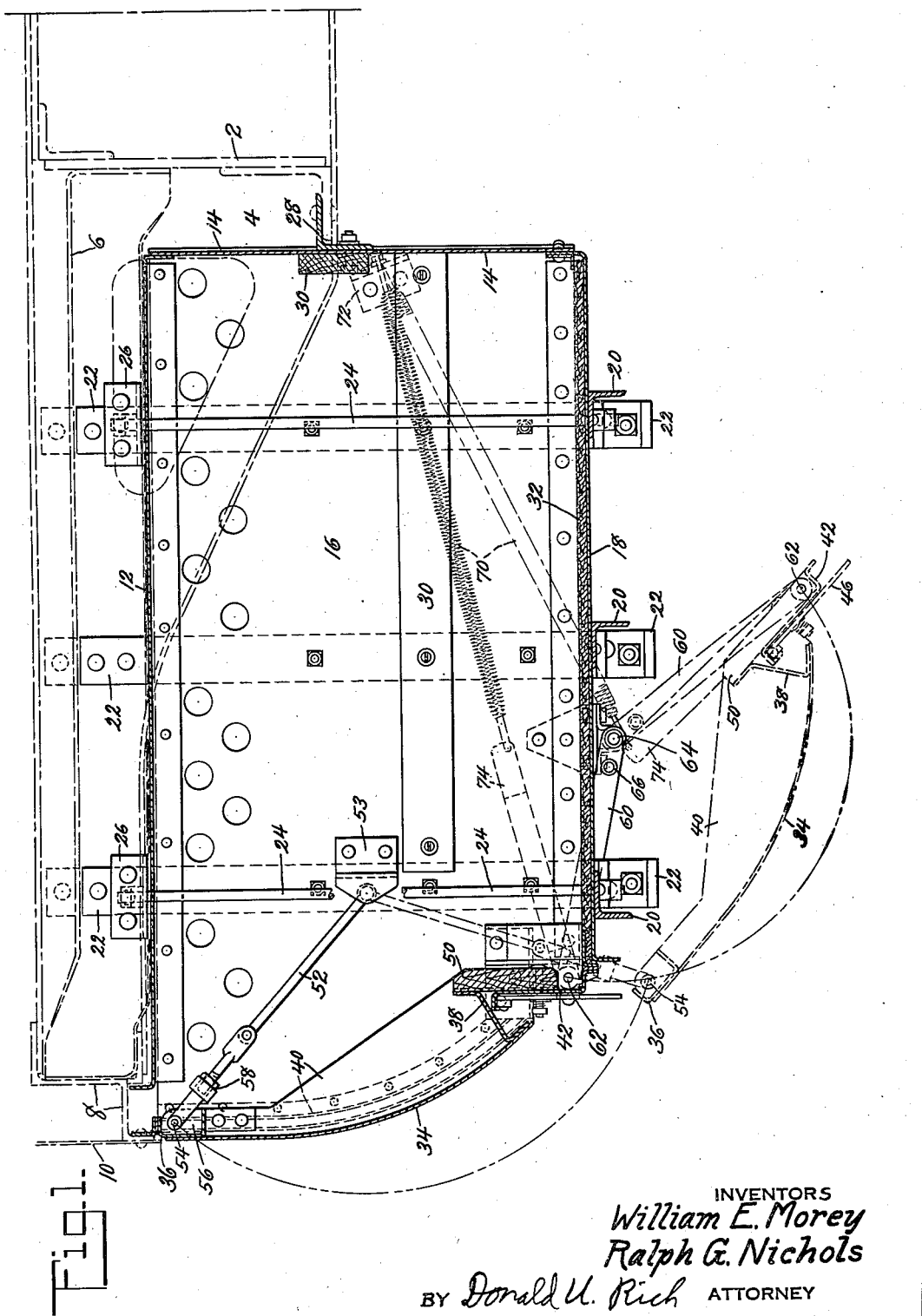

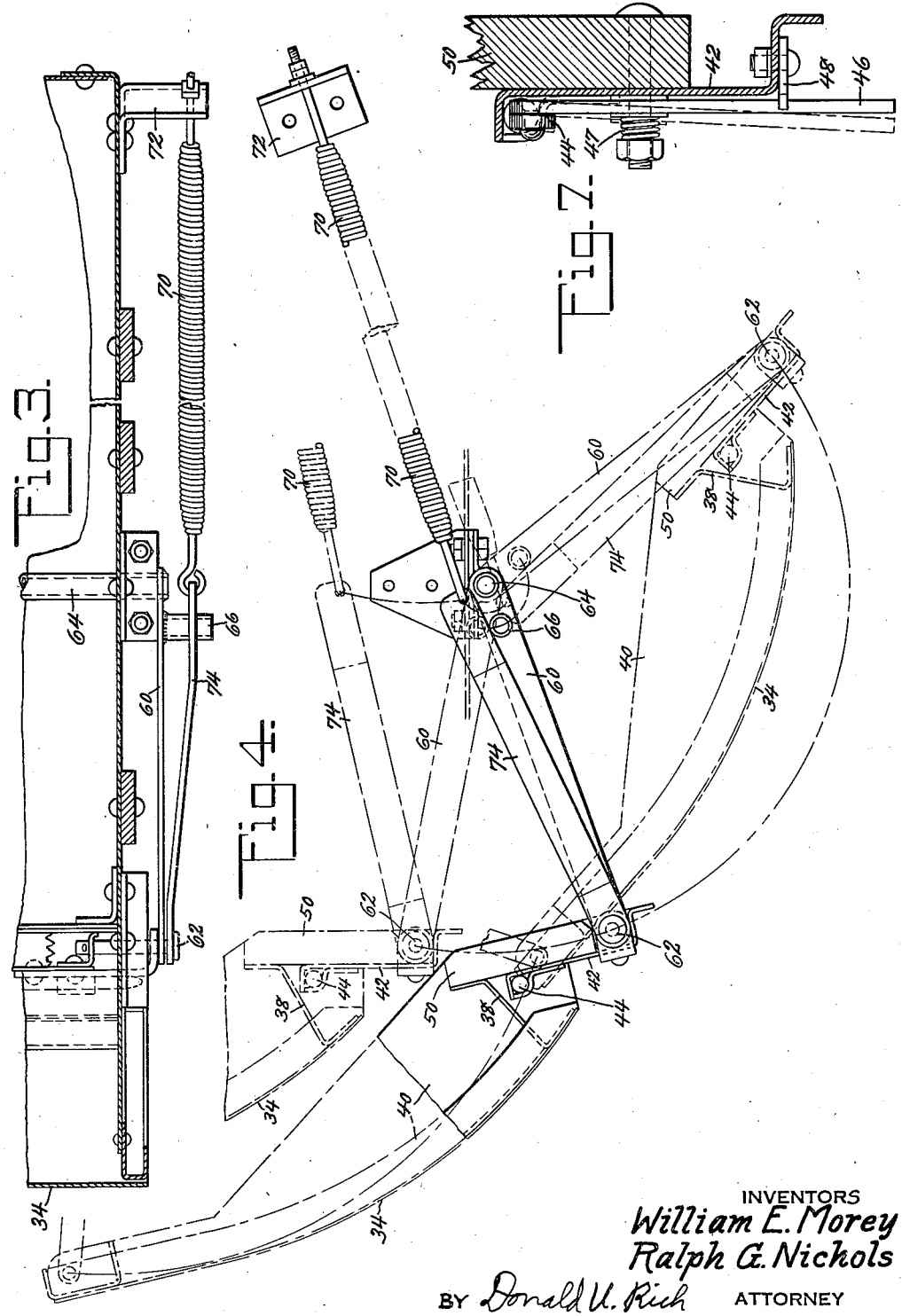

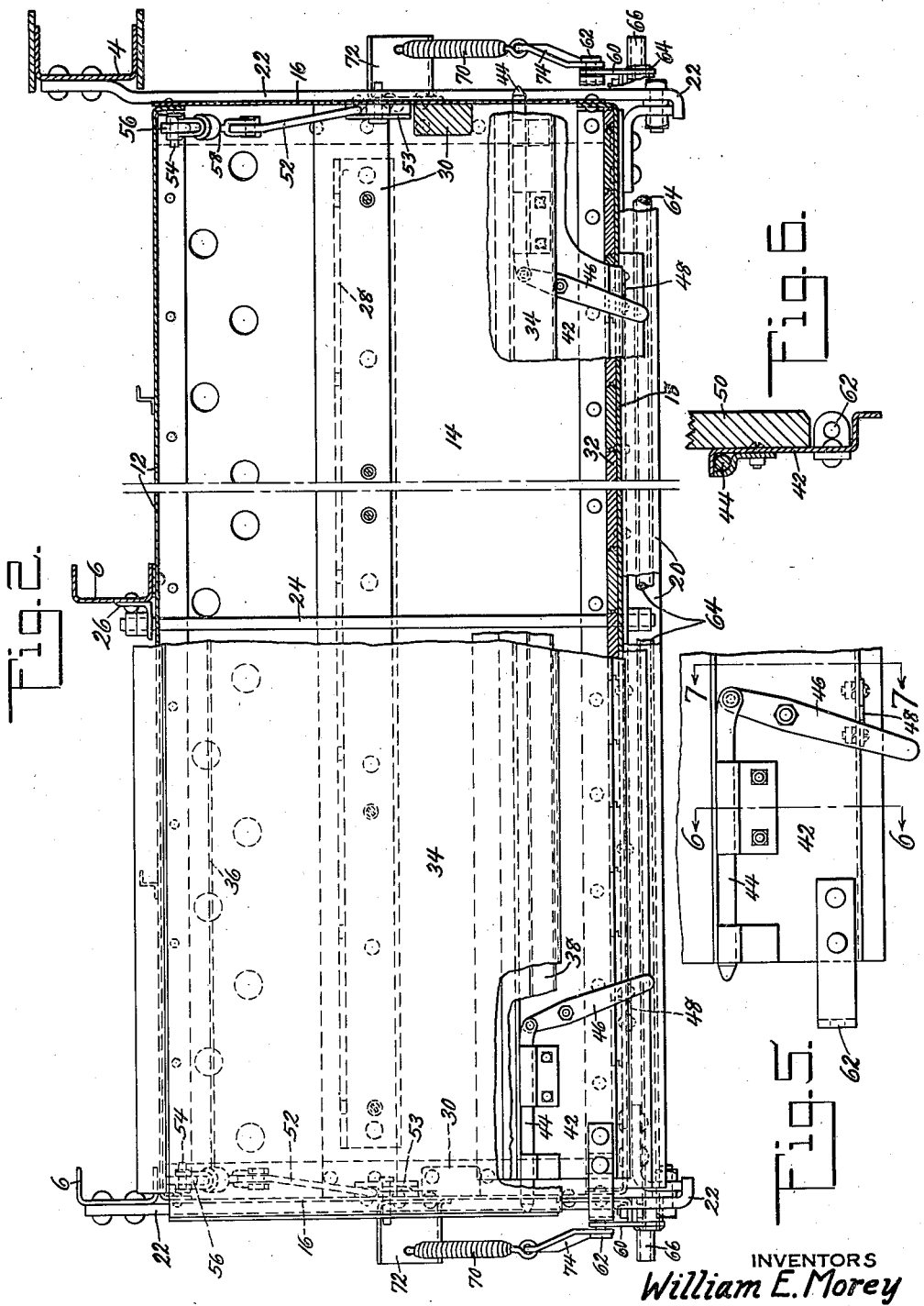

2,261,126

UNITED STATES PATENT OFFICE 2,261,126

BATTERY COMPARTMENT DOOR

William E. Morey and Ralph G. Nichols, St. Charles, Mo., assignors to American Car and Foundry Company, New York, N. Y., a corporation of New Jersey Application July 9, 1940, Serial No. 344,560

7 Claims. (Cl. 105—51)

This invention relates to doors for closing battery compartments and in particular to such compartments when carried on railway vehicles of the streamline or semi-streamline type.

In the past battery boxes or other compartments have been carried in an exposed position beneath the floor of the rail car but in recent years the tendency has been to provide skirtings extending down from the side wall of the car to cover the battery boxes or other auxiliary equipment, thereby enhancing the appearance of the car. Since the floors of rail cars are approximately four feet three inches from the rail and since the battery boxes or other compartments must be of considerable depth and mounted beneath the underframe members of the car, it will be obvious that the lower edge of the skirting must extend down fairly close to the rail line and in many cases to within sixteen inches or less of the rail line. In order to permit access to be had to the battery box or compartment doors have to be formed in the skirting. If the skirting doors are hinged to fold upwardly, then unsightly securing means must be provided on the side walls of the car and if it were proposed to fold the doors downwardly, access to the compartments would be made almost impossible. It is an object, therefore, of the present invention to provide a door for a battery box, which door conforms to the car skirting and which swings downwardly and inwardly beneath the floor of the compartment.

A further object of the invention is the provision of a link hung, skirt conforming battery box door which is counterbalanced by resilient means so connected to the door as to exert different counterbalancing effects thereon dependent on whether the door is open or closed.

A still further object of the invention is the provision of a link hung, skirt conforming battery box door having improved means for controlling the door's downward and inward swinging to its final open position.

These and other objects of the invention will be apparent to persons skilled in the art from a study of the following description and accompanying drawings, in which:

Figure 1 is a transverse sectional view through the car at the battery box or similar compartment;

Fig. 2 is a side view of the construction shown in Fig. 1 with a portion of the door broken away to better disclose the construction;

Fig. 3 is an enlarged horizontal sectional view of a portion of the battery box and disclosing the door control mechanism more fully;

Fig. 4 is an end view of the battery box showing the improved door mechanism in various positions;

Fig. 5 is an enlarged side view of a portion of the battery box showing the door latching arrangement;

Fig. 6 is a sectional view taken substantially on line 6—6 of Fig. 5, and

Fig. 7 is an enlarged sectional view taken substantially on line 7—7 of Fig. 5.

Referring now to the drawings in detail, it will be seen that the battery box in general consists of an open sided box attached to the car center sill 2 and carried beneath the underframe limits and inwardly of the skirting line which forms a continuation of the side walls below the car floor. The car in general consists of center sills 2 previously referred to, cross bearers 4, cross ties 6, all of which are joined to W-shaped side sill 8, to one flange of which is attached the side wall sheets 10.

The battery box itself consists of a top wall 12, back wall 14, end walls 16 and floor 18, all suitably connected together either by flanges on the sheets or by corner connection angles, whichever may be deemed most desirable. In order to support the box, angles 20 extend longitudinally of the box floor sheet and are attached at their ends to vertically extending straps 22. These straps, as clearly shown, are also attached to the end walls of the box and to either the cross bearer or cross tie. Additional support for the box floor is also provided by hanger bolts 24 extending through the floor of the box and through the longitudinal angles and attached at their upper ends by means of angle clips 26 to the cross tie located above the center of the box. The back wall of the box has attached thereto an angle 28 by means of which the rear edge of the box is supported on the flanges of the center sill structure. Battery buffing strips 30 are provided on the inner side of the battery box to prevent the battery cases coming in direct contact with the back or end walls, while a non-metallic floor 32 is provided covering the metallic floor sheet. These buffer strips and flooring members are preferably made of some acid resisting material, such as wood or a plastic.

The door structure consists of a skirt conforming sheet 34 stiffened at its top edge by channel form member 36 and at its bottom edge by a distorted Z-shaped stiffener 38. The ends and intermediate portions of the door sheet are stiffened by angles and gussets 40 which connect the upper and lower stiffeners and extend beyond the lower stiffener for attachment to a vertically located W-shaped door member 42. This W-shaped member in effect forms the bottom edge of the door but is spaced from the lower edge of the skirt conforming sheet in order to provide space to receive the latching mechanism. This latching mechanism consists of a sliding bolt 44 pivotally connected to an operating handle 46 and adapted to cause sliding of the bolt longitudinally of the W-shaped member and beyond its ends and into engagement with the side wall portion of the battery box. The operating handle 46 is held against the web of the W-shaped member by means of a spring 47 carried on the pivot axis of the operating handle and constantly urging the handle toward the web. A stop 48 is secured to the lower portion of the W-shaped member and will prevent movement of the operating handle unless moved outwardly to the line and dash position shown in Fig. 7. The inner face of the W-shaped door member is protected by means of wood or other nonmetallic members 50 adapted to act as stops preventing outward shifting of the batteries when the door is closed, thus the door consists of a skirt conforming portion and a combined lower edge and battery buffer strip.

The entire door structure is hung for a swinging motion upon a plurality of upper and lower links connected to the door and to the car structure or battery box end walls at spaced points. The upper links 52 are pivotally connected at their inner ends to bracket 53 carried on the end wall of the battery box and at their outer ends by means of pivot 54 extending through a bracket 56 secured within the upper door stiffener 36. An intermediate portion of the link 52 is made adjustable as indicated at 58 in order that inequalities of construction may be taken care of and in order that the door's upper edge will always be in substantial alignment with the side wall sheets of the car. The lower links 60 are connected at their outer ends to the door structure as at 62 and are rigidly joined at their inner ends to a pivot tube 64 extending longitudinally of the battery box and joining the lower links for joint operation. As most clearly shown in Figs. 2 and 3, the lower links 60 have welded or otherwise secured thereto a projection 66 located adjacent the pivot tube and between the pivot tube and the pivotal connection 62 of the link to the door. In order to counterbalance the door and to assist the operator in controlling the door, resilient means 70 are provided connected at one end by means of bracket 72 carried on the battery box or car structure and connected at the other end to a link 74, the outer end of which is pivotally connected to the door by the pivot pin 62 previously referred to. It is, of course, obvious that the link 74 could be connected to the door by means other than the pivot pin 62, but it is preferable that it be connected on this pin or at least in a manner such that the axis of its pivotal connection will coincide with the axis of the pivotal connection of the link 60 to the door. It will be noted that the stop 66 is of such a length as to prevent full swinging movement of the door control link 74.

The operation of the door control mechanism is as follows and assuming the parts to be in the fully closed position as indicated in full line in Figure 1: Retraction of the bolts 44 will release the door for opening movement and a downward force applied to the door will cause the same to swing outwardly and downwardly upon the links 52 and 60; in other words, from a position as shown by line and dash in Fig. 4 to a position such as shown in full lines, at which time the control link 74 of the door control mechanism has been stopped in its motion by stop 66. Continued pressure being applied to the door will cause its continued swinging on the links 52 and 60 to a position as shown in line and double dash in Fig. 4 which is the final open position. With the door in fully open position, it will be seen that the point of connection between the spring 70 and link 74 is slightly below the pivot axis of the pivot rod 64 and thus the spring will exert a small pressure in an upward direction, thereby retaining the door in the fully open position even though the position of the links 52 and 60 and door masts would tend to swing the door outwardly slightly from its fully open position. It is, of course, obvious that as the door moves downward the tension on the spring increases but the leverage arm decreases and, therefore, the counterbalancing effect will decrease. This counterbalancing effect will act to move the door closed until such time as the center line of the spring passes the center of the pivot rod 64 and after this occurs the spring will exert a slight pressure tending to move the door toward fully open position. In other words the maximum counterbalancing effect is obtained when the door is in its nearly closed position, while a small counterbalancing effect is obtained when the door is in its fully open position.

While the invention has been described more or less in detail with particular reference to the drawings, it is obvious that various modifications and rearrangements of parts will suggest themselves to persons skilled in the art and all such modifications and rearrangements of parts are contemplated as will fall within the scope of the appended claims defining our invention.

What is claimed is:

1. In a railway car having an underframe and side skirting extending downwardly below the underframe, the combination of a battery box carried by the car beneath portions of the underframe and behind the skirting line, a door for closing said box and conforming to the side skirting contour to form a smooth substantially continuous surface therewith when the door is closed, a pair of upper links connected to the door adjacent the upper edge thereof and inclining downwardly and inwardly for connection to the ends of the battery box, a pair of lower links connected to the door adjacent the lower edge thereof and extending inwardly for connection to the box, said links causing the door to move bodily downward and inward to a final open position beneath the battery box, stops secured to said lower links and extending outwardly therefrom, and door control means connected to the battery box and door and including resilient means and control links effective to counterbalance the weight of the door, said control links being so located as to strike said stops during movement of the door to open position whereby said resilient means is rendered less effective during the final opening movement of the door.

2. In a railway car having an underframe and side skirting extending downwardly below the underframe, the combination of a battery box carried by the car beneath portions of the underframe and behind the skirting line, a door for closing said box and conforming to the side skirting contour to form a smooth substantially continuous surface therewith when the door is closed, a pair of upper links connected to the door adjacent the upper edge thereof and inclining downwardly and inwardly for connection to the ends of the battery box, a pair of lower links connected to the door adjacent the lower edge thereof and extending inwardly for connection to the box, said links causing the door to move bodily downward and inward to a final open position beneath the battery box, door control means connected to the battery box and door and effective to counterbalance the weight of the door, and means for engagement by said door control means, the latter being so formed and arranged as to be varied in effectiveness during said engagement to render the same less effective during the final opening movement of said door.

3. In a railway car having an underframe and side skirting extending downwardly below the underframe, the combination of a battery box carried by the car beneath portions of the underframe and behind the skirting line, a door for closing said box and conforming to the side skirting contour to form a smooth substantially continuous surface therewith when the door is closed, a pair of upper links connected to the door adjacent the upper edge thereof and inclining downwardly and inwardly for connection to the ends of the battery box, a pair of lower links connected to the door adjacent the lower edge thereof and extending inwardly for connection to the box, said links causing the door to move bodily downward and inward to a final open position beneath the battery box, door control means connected to the battery box and door and effective to counterbalance the weight of the door, and means for engagement by said door control means, the latter being so formed and arranged as to be varied in effectiveness during said engagement to render the same less effective during the final opening movement of said door, said means comprising stops secured on said lower links adjacent the connection thereof to the battery box.

4. In a railway car having an underframe and side skirting extending downwardly below the underframe, the combination of a battery box carried by the car beneath portions of the underframe and behind the skirting line, a door for closing said box and conforming to the side skirting contour to form a smooth substantially continuous surface therewith when the door is closed, a pair of upper links connected to the door adjacent the upper edge thereof and inclining downwardly and inwardly for connection to the ends of the battery box, a pair of lower links connected to the door adjacent the lower edge thereof and extending inwardly for connection to the box, said links causing the door to move bodily downward and inward to a final open position beneath the battery box, door control means comprising resilient means connected to the battery box and door control links connected to the resilient means and to said door structure, and means carried by said lower links in such a position as to be engaged by said control links during opening movement of the door to change the motion of said door control links from a translatory movement to a rotational movement.

5. In a railway car having an underframe and side skirting extending downwardly below the underframe, the combination of a battery compartment carried by the car beneath the portions of the underframe and behind the side skirting line, a door for closing said compartment and conforming to the side skirting contour to form a smooth substantially continuous surface therewith when the door is closed, a pair of upper links pivotally connected to the car and to the door adjacent its upper edge, a pair of lower links pivotally connected to the compartment and to the door adjacent the lower edge thereof, said upper and lower links causing said door to swing downwardly and inwardly to an open position beneath the compartment, door control means connected to the car and to the door and effective to counterbalance the weight of the door, and means for engagement by said door control means, the latter being so formed and arranged as to be varied in effectiveness during said engagement to render the same less effective during the final opening movement of the door.

6. In a railway car having an underframe and side skirting extending downwardly below the underframe, the combination of a battery compartment carried by the car beneath portions of the underframe and behind the side skirting line, a door for closing said compartment and conforming to the side skirting contour to form a smooth substantially continuous surface therewith when the door is closed, a pair of upper links pivotally connected to the car and to the door adjacent its upper edge, a pair of lower links pivotally connected to the compartment and to the door adjacent the lower edge thereof, said upper and lower links causing said door to swing downwardly and inwardly to an open position beneath the compartment, door control means connected to the car and to the door and effective to counterbalance the weight of the door, and means for engagement by said door control means, the latter being so formed and arranged as to be varied in effectiveness during said engagement to render the same less effective during the final opening movement of the door, said means comprising stops secured on said lower links and so arranged as to change the motion of said door control links from a translatory movement to a rotational movement when contacted by said control links during movement of the door.

7. In a railway car having an underframe and side skirting extending downwardly below the underframe, the combination of a battery box carried by the car beneath portions of the underframe and behind the skirting line, a door for closing said box and conforming to the side skirting contour to form a smooth substantially continuous surface therewith when the door is closed, a plurality of links pivotally connecting said door to the battery box for causing the door to swing downward and inward to a final open position beneath the battery box, certain of said links being resiliently connected to the battery box and effective to counterbalance the weight of the door, and means with which said resiliently connected links contact during a portion of their movement while said door is being moved from closed to open position, said means being so arranged as to change the motion of said resiliently connected links from a translatory movement to a rotational movement and to reduce the effectiveness of the resilient means.

WILLIAM E. MOREY.
RALPH G. NICHOLS.